(12) United States Patent
Hassel et al.

(10) Patent No.: US 6,606,303 B1
(45) Date of Patent: Aug. 12, 2003

(54) METHOD AND DEVICE IN A PACKET SWITCHED NETWORK

(75) Inventors: Karl-Henrik Hassel, Kista (SE); Martin Johnsson, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/215,124

(22) Filed: Dec. 18, 1998

(30) Foreign Application Priority Data

Dec. 19, 1997 (SE) .............................................. 9704784

(51) Int. Cl.$^7$ .............................................. G01R 31/08
(52) U.S. Cl. .................. 370/238; 370/252; 709/241
(58) Field of Search ................................ 370/230, 231, 370/235, 238, 238.1, 252, 254, 400, 401, 395.1; 709/241; 379/114.02

(56) References Cited

U.S. PATENT DOCUMENTS

| | | | |
|---|---|---|---|
| 4,974,224 A | | 11/1990 | Boone |
| 5,481,604 A | | 1/1996 | Minot |
| 5,933,425 A | * | 8/1999 | Iwata .......................... 370/351 |
| 6,034,946 A | * | 3/2000 | Roginsky et al. ........... 370/238 |

FOREIGN PATENT DOCUMENTS

| | | |
|---|---|---|
| EP | 0 568 737 | 11/1993 |
| EP | 0 660 569 | 6/1995 |
| EP | 0 830 047 | 3/1998 |

OTHER PUBLICATIONS

Young, Lee, "Strategic Parameter–Driven Routing Models for Multi–Destination Traffic in Telecommunication Networks" IEEE International Conference on Systems, Man, and Cybernetics, vol. 4, pp. 3325–3330 (1997).

* cited by examiner

*Primary Examiner*—Huy D. Vu
*Assistant Examiner*—Duc Ho

(57) ABSTRACT

In a packet switched network, the link having the lowest cost to a certain destination is obtained. For each link to the destination, the link cost is calculated based on at least two parameters, the link having the lowest link cost is selected. The calculated link costs are stored in a routing table. The parameters used comprise the maximum cell transfer delay (CTD), the peak-to-peak Cell Delay Variation (CDV), the Available Cell Rate (AvCR), the Maximum Cell Rate (MCR) and the Cell Loss Ratio (CLR). An Administrative Weight (AW) may also be included. Each parameter may be weighted by a weighting factor (k1, k2, . . . , k6) and scaled by an exponent ($\alpha$, $\beta$, $\gamma$, $\delta$, $\epsilon$). The sum of link costs and certain non-additive parameters is used to calculate path costs.

10 Claims, 1 Drawing Sheet

METHOD AND DEVICE IN A PACKET SWITCHED NETWORK

TECHNICAL FIELD

The present invention relates to the routing of connections in a telecommunications network, and especially to routing in packet switched networks.

BACKGROUND

A common type of packet switched network today is the Asynchronous Transfer Mode (ATM) network. The ATM technology is connection-oriented, that is, resources are allocated in the network during to the establishment of a connection between two or more users of the network.

Each ATM connection has a traffic contract specifying the capacity, behaviour and quality of service of the connection. The traffic contract is specified when a connection is requested by a calling user and is maintained for the lifetime of the connection. Thus, the consequences of an inefficient routing decision will affect a connection for as long as the connection remains open. Thus, the path through the network should be selected carefully to ensure that the tic contract can be met as long as the connection exists.

In a private Asynchronous Transfer Mode (ATM) network the PNNI function, as specified by the ATM Forum will probably become the chosen function for resource management with respect to routing and signalling, and other functions. A part of the PNNI is a so called dynamic routing protocol meaning that a node in the network will announce and update information regarding its own identity, the resources on its outgoing links and in the node, and address reachability, to all neighboring nodes. This way, in the end all nodes in the network will have a complete hierarchical view of the topology of the network, including its available resources.

The PNNI protocol is defined for use between private ATM switches and between private ATM networks. The abbreviation PNNI stands for either Private Network Node Interface or Private Network-to-Network Interface, reflecting these two areas of use. PNNI routing is used in a private network of ATM switching systems. PNNI includes a routing protocol for distribution of topology information between switches and groups of switches. The functions of the PNNI routing protocol include, among other things:

discovery of neighbours and link and node status, synchronization of topology databases, construction of the routing hierarchy, transmission of PNNI topology state elements from each node to all other nodes.

A topology state parameter is a generic term that refers to either a link state parameter or a nodal state parameter. Topology state parameters fall into two categories: topology metric and topology attribute. A topology metric is a topology state parameter that requires the values of the state parameters of all links and node along a given path to be combined in an additive manner to determine whether the path is acceptable and/or desirable for carrying a given connection. A topology attribute is a topology state parameter that is considered individually to determine whether a given link or node is acceptable and/or desirable for carrying a given connection. In this document the word parameter is used to cover both metrics and attributes.

Two basic routing techniques are used in networking: source routing and hop-by-hop routing. In source routing, the originating switching system selects the path to the destination based on its local knowledge of the network topology. Other systems along the path obey the routing instructions from the source.

In hop-by-hop routing each system independently selects the next hop, which results in a progress toward the destination provided the decisions made at each hop are sufficiently consistent. This technique has some serious disadvantages in a packet switched network. Routing loops may be created, and the processing cost associated with path selection increases for each hop.

To avoid the problems of hop-by-hop routing PNNI uses source routing for all connection setup requests. The first node in a peer group selects the entire path across that peer group and across all other peer groups for the purpose of reaching the destination. The path is encoded as a set of Designated Transit Lists (DTLs) explicitly included in the connection setup request. The DTLs specify every node used in transit across the peer group and may also specify the logical links to be used between the nodes. If a node along the path is unable to follow the DTL for a specific connection setup request the node must perform a so called crankback, that is, return the connection setup request to the node in which the DTL was created.

In general, all links between nodes and all nodes have available resources assigned to them. The available resources in a node are specified for every pair of ports in the node. This is normally done by specifying a default resource for the node and deviations from the default resource for each pair of ports. An exception to the above is the simple node, in which infinite resources are available, and which is therefore not associated with any costs.

A least-cost route is the route with the highest resource margin requiring the minimum allocation of resources compared to other routes, considering both the links between the nodes and the links within the nodes. The resources of the network are nodes and links with their associated available relative capacity and quality of service. As resources are allocated along the least-cost route it may as a result cease to be the least cost route. Another route will then become the least cost route. To rebuild routing tables, the link cost function must be used first to be able to compute the least-cost route.

In this document, the word link is taken to mean either a link between nodes or a path through a node, between two ports of the node. There are two main types of links through nodes: spokes and bypasses. A spoke is a connection in a logical node representation between an interior reference point of the logical node referred to as the nucleus, and a port representing links to other nodes. A bypass is a connection between two ports that does not pass through the nucleus.

A routing algorithm should be able to adapt to a network operator's routing policy, which may change over time. A cost function can be made to match the operator's requirements, which will normally be for maximum call throughput combined with other specific requirements.

Normally routing is not carried out for each call setup request. Instead, a routing table is built, comprising information about possible routes to all destinations that may be reached through the network.

One known routing algorithm commonly used today is the Dijkstra algorithm. This and other known algorithms are capable of routing based on one constraint, for example, to minimize the number of hops or the delay. In other words: given a network topology and a single parameter associated with each link in the graph, Dijkstra's algorithm can quickly find the path between two points minimizing the sum of link parameters in the path. This method is not adequate for the ATM service category real time Variable Bit Rate (rt-VBR), in which multiple constraints must be considered.

Routing for connections with multiple performance constraints complicates the problem in two ways. First, each link must be described in terms of multiple parameters. Second, the ability of a link to participate in a path depends on the requirements of the connection being routed. Having fill topology information and status about actual network resources and capacity is necessary to be able to compare different link costs with each other in order to build least-cost routes to every other destination in the network. The PNNI distributes complete routing information to all nodes, making it desirable to use Dijkstra's algorithm, which, however can only optimize on one parameter. For example, the path for which the delay is minimized may very well have an unacceptably low bandwidth or high delay variation, or vice versa.

One solution to the problem could be to run Dijkstra once for each different type of parameter in the network. Then every parameter would be optimized separately. This would lead to a set of overlapping routes where every route is optimized with regard to only one parameter constraint. From the set of overlapping routes, then the shortest path could be selected as the route having the largest number of overlapping routes. This algorithm is probably inefficient for large networks.

Another solution could be to use the Dijkstra algorithm and optimize only one topology state parameter, under the condition that every topology state parameter will fulfil the host's requirements regarding transmission performance. To ensure that every topology state parameter will fulfil the host's requirements, a generic connection admission control would have to be performed, considering a unique host's requirement directly. To use this solution routing would have to be performed for each incoming call request. This algorithm cannot be used to build routing tables, because every host's specific requirements cannot be considered when building routing tables, as the table would then become too big. Also, the requirements of one particular host may not be satisfactory to all other hosts.

SUMMARY

It is an object of the present invention to create least cost routes from every node in the network to every destination that is reachable from that node.

It is another object of the present invention to enable the selection of a link, or a whole path, in an ATM network with multiple constraints.

It is yet another object to enable the routing of rt-VBR connections.

It is another object to enable the routing of all types of connections with one algorithm.

It is yet another object of the invention to enable the building of routing tables based on multiple constraints.

It is another object to achieve a method for path cost or link cost computation reflecting the resource margin, and the resources that must be allocated, in such a way that the higher the resource margin the lower the path cost or link cost.

These objects are achieved by the present invention by a method in a packet switched network of obtaining the link having the lowest cost to a certain destination comprising the steps of for each link to the destination, calculating the link cost based on at least two parameters; and selecting the link having the lowest link cost.

According to a preferred embodiment, the calculated link costs are stored in a routing table.

The parameters used comprise the maximum cell transfer delay (CTD), the peak-to-peak Cell Delay Variation (CDV), the Available Cell Rate (AvCR), the Maximum Cell Rate (MCR) and the Cell Loss Ratio (CLR). An Administrative Weight (AW) may also be included. These parameters are specified in the PNNI routing specification, agreed by the ATM Forum, and will be explained in somewhat more detail below.

In a preferred embodiment, each parameter is weighted by a weighting factor (k1, k2, . . . , k6) and scaled by an exponent ($\alpha$, $\beta$, $\gamma$, $\delta$, $\epsilon$).

A method in a packet switched network of obtaining the path having the lowest cost to a certain destination, is also disclosed, comprising the steps of for each link in the path, calculating the link cost according to any one of the preceding claims;

Adding the link costs of each path to the destination, to form the path costs;

Selecting the path having the lowest path cost.

A cost depending on the number of hops performed along the path, may be added to the path cost of each path. Certain non-additive parameters may also be added to the path cost.

A node in a packet switched network is also disclosed, said node being adapted to communicate the available resources of all its links, spokes and bypasses to all its neighbouring nodes;

receive information about available resources from all neighbouring nodes;

for each link, spoke and bypass about which it has information, calculate the link cost based on at least two parameters;

store the calculated information in a routing table.

The invention offers the following advantages:

The routing with respect to multiple constraints in a PNNI network environment specifically addressing the traffic contracts of the rt-VBR service categories is enabled.

The multiple parameters to be considered are reduced to one single entity by the algorithm.

It is adaptable to dynamic routing policies, giving different parameters different priority depending on the actual traffic characteristic and optimization criteria.

The link cost and path cost functions can be tailored according to the requirements of the network operator regarding resource utilization, routing performance, call setup throughput and other parameters, and can be changed as the requirements change.

The scalability and flexibility of the network are kept.

DETAILED DESCRIPTION

Figure 1:
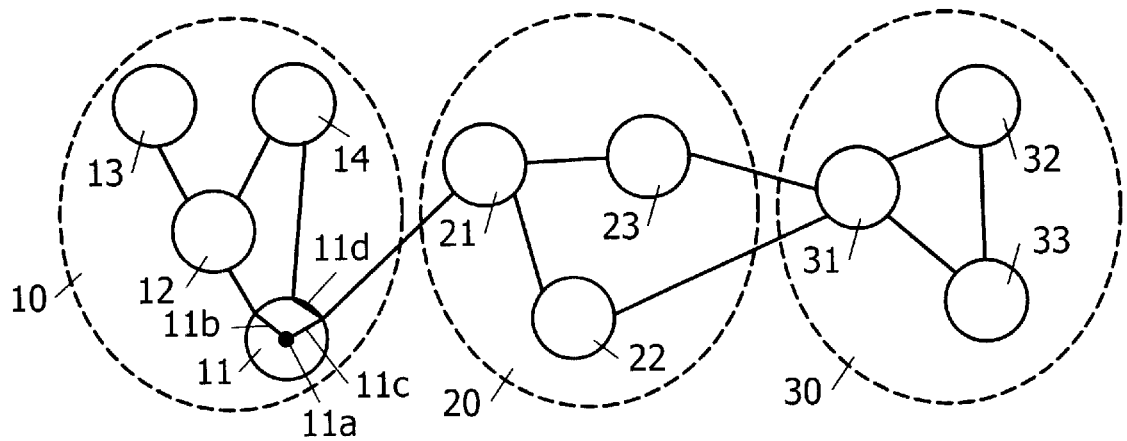
FIG. 1 shows schematically a packet switch network with two hierarchical levels according to the PNNI protocol.

FIG. 1 is a schematic representation of a packet switch network comprising a number of logical nodes and with two hierarchical levels. The lowest level of the PNNI hierarchy comprises the logical nodes that are organized into peer groups. The nodes in a peer group exchange information with the other nodes in the group, so that all nodes in the group have an identical view of the group and of other peer groups. Each logical node sees all nodes in its own peer group, but sees every other peer group only as a single node.

If three hierarchical levels are included, each node sees all the nodes on its own level that belong to the same peer group. The other peer groups that belong to the same higher order group are seen as nodes, and the remaining higher order groups are seen as nodes. In a similar way, any number of hierarchical levels may be included, in dependence of the size of the network.

In FIG. 1, the actual network is shown in solid lines and comprises a first peer group 10 comprising four ATM nodes 11, 12, 13, 14, a second peer group 20 comprising three ATM nodes 21, 22, 23, a third peer group 30 comprising three ATM nodes 31, 32, 33.

The first node 11 of the first group 10 is connected to the second 12 and the fourth 14 node of the first group, and to the first node 21 of the second group. The second node 12 of the first group 10 is connected to all three other nodes 11, 13, 14 in the first group 10.

Each node comprises a nucleus, but only the one 11a of the first node 11 of the first peer group 10 is shown. A first 11b and a second 11c spoke are shown between the nucleus 11a and the port connected to the second node 12 and between the nucleus 11a and the port connected to the first node 21 of the second peer group 20, respectively. A bypass 11d is shown between the port connected to the fourth node 14 and the port connected to the first node 21 of the second peer group 20. Of course, there are other spokes and bypasses in this and other nodes; these are left out for clarity.

In the second group 20 the first node 21 is connected to the second 22 and the third 23 node. The second 22 and the third 23 node are connected to the first 31 node of the third group 30. All three nodes 31, 32, 33 of the third group 30 are interconnected.

Figure 2:
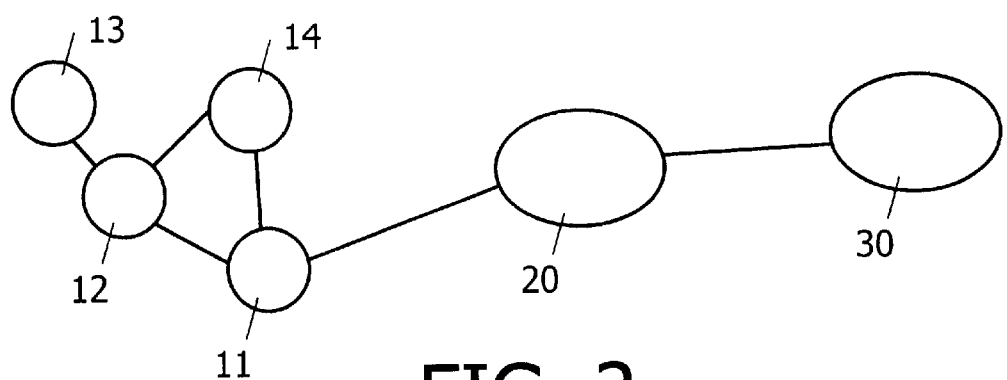
FIG. 2 is a schematic representation of the packet switch network shown in FIG. 1, as seen front one node in the network.

FIG. 2 is a schematic representation of the network shown in FIG. 1, as seen from any of the nodes in the first peer group 10. Each node 11, 12, 13, 14 has information about all other nodes in this peer group but only sees the second peer group 20 as one logical node and the third peer group 30 as another logical node, without seeing the nodes within the peer groups.

There may be further hierarchical levels on which, for example the three peer groups 10, 20, 30 shown may form one peer group in a larger network.

Links going from a lower level node to one on a higher level for example the link from the first node 11 of the first group 10 to the second group 20, are called uplinks.

In PNNI, links are advertised unidirectionally, in the outgoing direction, but connections are always bidirectional, both directions using the same route. Therefore, the associated total link cost of a bidirectional link takes the network resources allocated both directions into consideration when computing the link cost.

Denominations:

The following parameters are used in the document:

$cost_{link}$ is a bidirectional link cost function $cost_{path}$ is the total cost of a path, comprising the costs of all links in the path. As mentioned before a link can be either between two nodes, or through a node CDV is the peak to peak Cell Delay Variation. The CDV is the variation in cell delay, specified in microseconds.

CTD is the maximum Cell Transfer Delay. The CTD is the sum of the fixed delay component across the link and the cell delay variation.

AvCR is the absolute Available Cell Rate. The AvCR is a measure of the available capacity for the CBR, rt-VBR and non-rt-VBR. For the ABR service category, AvCR is a measure of the capacity available for the minimum cell rate reservation.

MCR is the Maximum Cell Rate. The MCR is the maximum capacity that may be used by connections belonging to the specified service category.

CLR is the Cell Loss Ratio, defined as the ratio of the number of cells that do not make it across the link to the total number of cells transmitted across the link or node.

AW is the Administrative Weight, that is, a parameter that can be set by the operator, for example, to direct traffic to certain links rather than other ones.

AvCR/MCR is the relative Available Cell Rate

All the above mentioned parameters may be seen as independent of each other, that is they do not affect each other.

Link Cost Function

The general link cost function is given as $$cost_{link} = f1(CTD) + f2(CDV) + f3(CLR) + f4(AvCR,MCR) + f5(AW) \quad (1)$$

in which the functions f1, f2, ..., f5 are arbitrarily selected functions. An embodiment of the function is shown in equation (2):

$$cost_{link} = k1*CTD^{\alpha} + k2*CDV^{\beta} + k3*CLR^{\gamma} + k4*\left(\frac{AvCR}{MCR}\right)^{\delta} + k5*AW^{\epsilon} \quad (2)$$

k1, k2, ..., k5 being freely selectable constants. As will be obvious to the skilled person, other parameters can easily be added to the equation as found suitable.

This function applies both to links between nodes and to the spokes and bypasses within a logical group node.

The selection of the weight constants k1, k2, ..., k5 and the scaling factors $\alpha, \beta, \gamma, \delta$ and $\epsilon$ is made according to the routing criteria that the network operator wishes to optimize on. The weight constants k1, k2, ..., k5 are used to set the weight of a particular parameter. The values of the weight constants are based on the traffic characteristics and are selected in such a way as to satisfy the desired behaviour of the routing algorithm. The scaling factors $\alpha, \beta, \gamma, \delta$ and $\epsilon$ are set to give each parameter a suitable priority and to choose the interval in which a change in each parameter will contribute the most to a change in the function. The scaling factors $\alpha, \beta, \gamma, \delta$ and $\epsilon$ enable a network operator to change both the sensitivity and the priority for a topology state parameter and the interval in which the parameter will be given the highest priority.

As will be understood by the skilled person, any of the weight constants k1, k2, ..., k5 may be set to zero, to omit one or more of the parameters CTD, CDV, CLR, AvCLR/MCR and AW.

The $cost_{link}$ function may also be applied when routing connections of all other service categories. For non-real time Variable Bit Rate, the constants k1 an k2 may be set to zero.

In one embodiment of the link cost function, all scaling factors $\alpha, \beta, \gamma, \delta$ and $\epsilon$, and the parameter MCR, are set to 1, giving the equation $$cost_{link} = k1*CTD + k2*CDV + k3*CLR + k4*\left(\frac{AvCR}{1}\right) + k5*AW \quad (3)$$

The weight constants k3 and k4 are negative. These simplifications reduce the computation time of the algorithm as the number of arithmetic operations to be carried out has been reduced.

This equation requires the following number of arithmetic operations:

5 multiplications
4 additions

The scaling factors $\alpha$, $\beta$, $\gamma$, $\delta$ and $\epsilon$ being set to zero makes a change in a parameter equally important over the whole range of the parameter interval.

In another embodiment, the weight constants k3 and k4 are still negative, the scaling factor $\alpha=2$, the other scaling factors $\beta$, $\gamma$, $\delta$ and $\epsilon$ are all set to 1 and MCR$\neq$0. This gives the following equation:

$$cost_{link} = k1*CTD^2 + k2*CDV + k3*CLR + k4*\left(\frac{AvCR}{MCR}\right) + k5*AW \quad (4)$$

Thus the CTD is considered the most important parameter, that should influence the link cost the most. The relative weight of the other parameters, CDV, CLR, AvCR/MCR and AW are controlled by the weight constants k2, k3, k4, k5, respectively.

This equations requires the following number of arithmetic operations:

6 multiplications
1 division
4 additions

To determine the link having the lowest cost to a certain destination, the link cost function, as given by equation (1) is minimized.

Path Cost Function

One embodiment of a general path cost function is found by adding the costs of all links comprised in the path and adding a cost for each hop in the network. The hop parameter is used to increase the path cost of a route that allocates many network resources. A hop is equal to a link between two nodes being traversed.

$$cost_{path} = \sum_{links} cost_{link} + f6(Hop) \quad (5)$$

in which $cost_{link}$ is given by equation (1).

In another embodiment, the non-additive parameters ACR and CLR are not included in the costlink function for each link. Instead, the minimum value $(ACR/MCR)_{min}$ and the maximum value $CLR_{max}$ are used, giving the following equation:

$$cost_{path} = \sum_{links} ((k1*CTD^\alpha + k2*CDV^\beta) + k5*AW^\epsilon) + k3*CLR_{max}^\gamma + k4*\left(\frac{ACR}{MCR}\right)_{min}^\delta + k6*Hop^\lambda \quad (6)$$

To determine the route having the lowest cost to a certain destination, the path cost function, as given by equation (5) or (6) is minimized.

Normally, the calculations are not carried out each time a connection is to be set up. Rather, the calculations are carried out once and the result is stored in a routing table. Each node has its own routing table comprising information about all nodes in the same peer group and all the other peer groups.

To build a routing table in each node, each node determines its available resources and transmits this information to all neighbouring nodes. Each node also forwards information received from other nodes, so that in the end each node has information about all other nodes. Based on this information, equation (1) is used to calculate the link costs of all links, and equation (5) or (6) is used to calculate the path cost of all paths to all reachable destinations. The least cost path, or paths, to every destination may then be stored in the routing table. An arbitrary number of paths may be stored.

Referring to FIG. 1, for example, if the second node 12 in the first peer group 10 wishes a connection to the second node 32 in the third peer group 30, it selects the link to the first node in its own peer group, that is node 11, the link from this node to the second peer group 20 and the link from the second peer group 20 to the third peer group 30, but has no information about the actual route through these peer groups. The routing to the second node 32 in the third peer group is carried out by the node 31 in this peer group 30 that is connected to the second peer group, that is, the first node 31.

A routing table is updated when the available resources of a node or link is changed or when the address reachability in the network is changed.

If the cost of a link changes, all routes using this link have to be recalculated as well as every node that is reachable from these routes, and so on. If something changes far away from the switching system, not very much will change, whereas a change in the immediate neighbourhood is likely to affect all routes.

What is claimed is:

1. A method in a packet switched network of selecting a lowest cost path to a particular destination, said path including at least one link between network elements, said method comprising the steps of:

for each candidate link to the destination, calculating a link cost based on at least two parameters, wherein each parameter is multiplied by a weighting factor that causes the impact of each parameter on the link cost to vary linearly with changes in the weighting factor, and each parameter is scaled by an exponential factor that causes the impact of each parameter on the link cost to vary exponentially with changes in the exponential factor; and selecting the candidate link having the lowest calculated link cost.

2. A method according to claim 1, further comprising storing the calculated link costs in a routing table.

3. A method according to claim 1, wherein the parameters used comprise at least a peak-to-peak Cell Delay Variation (CDV).

4. A method according to claim 1, wherein the parameters used comprise at least a peak-to-peak Cell Delay Variation (CDV).

5. A method according to claim 1, wherein the parameters used comprise at least an Available Cell Rate (AvCR) and a Maximum Cell Rate (MCR).

6. A method according to claim 1, wherein the parameters used comprise at least a Cell Loss Radio (CLR).

7. A method in a packet switched network of selecting a lowest cost path to a particular destination, said path including a plurality of links between network elements, said method comprising the steps of:

for each link in each candidate path to the destination, calculating a link cost based on at least two parameters, each parameter being multiplied by a weighting factor that causes the impact of each parameter on the link cost to vary linearly with changes in the weighting factor, and each parameter being scaled by an exponential factor that causes the impact of each parameter on the link cost to vary exponentially with changes in the exponential factor;

adding together, the calculated link costs associated with the links in each candidate path to determine a calculated path cost for each path; and selecting the candidate path having the lowest calculated path cost.

8. A method according to claim 7, further comprising the step of adding a cost depending on the number of hops performed along the path, to the path cost of each path.

9. A method according to claim 7, further comprising the step of adding a cost for at least one non-additive parameter to the path cost.

10. A node in a packet switched network, said node having a plurality of links, spokes, and bypasses that provide network resources for communicating with a plurality of neighboring nodes, said node being adapted to:

communicate the available resources of all its links, spokes, and bypasses to all its neighboring nodes;

receive information about available resources from all neighboring nodes;

for each link, spoke, and bypass about which the node has information, calculate the link cost based on at least two parameters, each parameter being multiplied by a weighting factor that causes the impact of each parameter on the link cost to vary linearly with changes in the weighting factor, and each parameter being scaled by an exponential factor that causes the impact of each parameter on the link cost to vary exponentially with changes in the exponential factor; and store the calculated link costs in a routing table.

* * * * *